United States Patent [19]

Chen

[11] Patent Number: 5,724,069
[45] Date of Patent: Mar. 3, 1998

[54] SPECIAL PURPOSE TERMINAL FOR INTERACTIVE USER INTERFACE

[76] Inventor: Jack Y. Chen, 3773 Fox Pointe Rd., Rockford, Ill. 61114

[21] Appl. No.: 275,847

[22] Filed: Jul. 15, 1994

[51] Int. Cl.[6] .................................................. G09G 5/00
[52] U.S. Cl. .......................................... 345/172; 345/173
[58] Field of Search ..................................... 345/156, 168, 345/169, 173, 901, 903, 905, 172; 364/708, 709.01, 709.02, 709.11, 709.12, 709.15

[56] References Cited

U.S. PATENT DOCUMENTS

| | | | |
|---|---|---|---|
| D. 287,969 | 1/1987 | Kusanagi | D14/106 |
| D. 310,662 | 9/1990 | Fellman et al. | D14/106 |
| D. 345,351 | 3/1994 | Wingate | D4/115 |
| 2,909,761 | 10/1959 | Rockola | 340/162 |
| 4,333,097 | 6/1982 | Buric et al. | 340/711 |
| 4,497,036 | 1/1985 | Dunn | 364/708 |
| 4,524,414 | 6/1985 | Kiyokawa | 345/168 |
| 4,634,970 | 1/1987 | Payne et al. | 345/134 |
| 4,667,299 | 5/1987 | Dunn | 364/708 |
| 4,845,495 | 7/1989 | Bollard et al. | 340/973 |
| 4,879,548 | 11/1989 | Mitarai et al. | 340/712 |
| 4,964,018 | 10/1990 | Mallory et al. | 361/391 |
| 5,020,012 | 5/1991 | Stockberger et al. | 364/709 |
| 5,050,116 | 9/1991 | Stahnke | 364/709 |
| 5,059,960 | 10/1991 | Rosenberg et al. | 340/111 |
| 5,121,477 | 6/1992 | Koopmans et al. | 395/156 |
| 5,177,328 | 1/1993 | Ito et al. | 345/173 |
| 5,185,628 | 2/1993 | Wilson et al. | 355/209 |
| 5,202,817 | 4/1993 | Koenck et al. | 361/393 |
| 5,250,929 | 10/1993 | Hoffman et al. | 345/173 |
| 5,268,816 | 12/1993 | Abel, Jr. et al. | 361/729 |
| 5,302,969 | 4/1994 | Kuroda et al. | 345/168 |
| 5,305,014 | 4/1994 | Mutschler et al. | 345/173 |

*Primary Examiner*—Mark R. Powell
*Assistant Examiner*—Matthew Luu
*Attorney, Agent, or Firm*—Leydig, Voit & Mayer, Ltd.

[57] ABSTRACT

A special purpose microcomputer-based terminal for interactive user interface. The terminal includes a general purpose microcomputer and an interface module made up of a general purpose display screen and an array of pushbuttons positioned along the sides of the screen. Actuating a pushbutton causes the interface module to generate a standard keystroke signal which is transmitted to the microcomputer through the keyboard port. The input elements of the user interface thus make use of the standard keyboard drivers normally available in a general purpose microcomputer to communicate with the application program. The application program in the computer memory displays on-the-screen selection indicators for available options coordinated to the positions of the pushbuttons, and actuating a button serves to select an option. The application program may present to a user options organized in hierarchal menu tree fashion, and the user may select a path through the menu tree by consecutively actuating the buttons.

18 Claims, 11 Drawing Sheets

SPECIAL PURPOSE TERMINAL FOR INTERACTIVE USER INTERFACE

FIELD OF THE INVENTION

The present invention relates generally to a microcomputer-based terminal, and more particularly to a special purpose terminal based on a general purpose microcomputer, and having a simplified user interface.

BACKGROUND OF THE INVENTION

Special purpose microcomputer-based terminals have been widely used in consumer service applications. For example, a department store can use an interactive terminal to provide a customer with information about the prices and selections of goods in the store, or a restaurant can use an interactive terminal for taking orders from a customer. Generally the terminal-user interactive interface is accomplished by the terminal presenting available options on an output device to a user, and the user indicating through an input device the option selected. Many different types of input and output devices may be used. For example, the output device may be a printer or a display screen, and the input device may be a standard keyboard or a mouse. A touch screen may also be used to serve both the input and output (I/O) functions.

Using a standard keyboard in the user interface is quite acceptable for a general purpose terminal, where some computer familiarity is expected, but for a special purpose terminal for the non-computer experienced user, the standard keyboard interface is less than desirable. It may present too many options, it may trigger a computer-phobic reaction, and indeed it may present too many opportunities for a user to affect the computer terminal beyond the intended limited special purpose functions intended.

Heretofore, a particularly attractive user interface for special purpose terminals has been the touch screen. When a touch screen is used as the I/O device of an interface terminal, the application program can be designed to display selection indicators on the screen, and a touch of a selection indicator on the screen will be detected and interpreted by the program as the selection of that option. A touch screen is often preferred to a keyboard or a mouse as the input device because the user actions for using a touch screen, i.e. looking and pointing, are often considered to be simple and intuitive. It is also often desirable to have one device serving both input and output functions instead of using physically separate input and output devices.

A touch screen, however, is not without disadvantages. Special construction and electronics are required for sensing a touch and determining the location of the touch on the screen. Feeding such information into the microcomputer also requires specially designed driver circuits and a specially designed computer interface. These special circuits not only increase the cost of the touch screen interface, but also increase the difficulty of software development because the software must be specially designed to communicate with the driver circuit. The system portability of the interface terminal is also reduced because the touch screen cannot be used with another microcomputer which does not have the special drivers. The special design of the front end (interface and drivers), typically demands that a special purpose terminal with touch screen interface be available for development or modification of application programs.

Another problem with the touch screen is that the screen can get contaminated from contact with hands rather quickly. This problem is especially serious in a restaurant setting where the device is used for menu selection, because the user of the terminal may also have to handle foods. Devices using a keyboard or a mouse are also not suitable for restaurant applications due to the danger of accidental damage caused by, for example, spilling drink on the keyboard.

SUMMARY OF THE INVENTION

In view of the foregoing, it is a general aim of this invention to provide a special purpose terminal using general purpose computer hardware, to achieve simplicity and directness like that of a touch screen, but to avoid the disadvantages of a touch screen.

In accomplishing that aim, it is an object of the present invention to provide a special purpose terminal using general purpose computer hardware to the maximum extent possible, and to achieve a user interface like that of a touch screen, but without the complication or expense of special purpose drivers or interface circuits normally associated with a touch screen. It is a related object to use the drivers normally associated with a general purpose computer to interface a special purpose user-friendly input device to the general purpose computer.

According to a particular application of the invention, it is an object to provide a user interface device which is suitable for use in an environment like a restaurant where contamination of the device is a concern.

It is a feature of the invention that a standard general purpose microcomputer is operated without a standard keyboard, and a special purpose user interface is connected to the keyboard port of the general purpose computer, the application software of the system serving to assign functions to an array of pushbuttons of the user interface, and to interpret pushbutton actuations according to the assigned functions.

It is a subsidiary feature of the invention that the application programs for the special purpose terminals are designed in several levels, preferably nested in hierarchal menu tree fashion, and the functions are assigned by displaying, on a general purpose display, the functions for the respective pushbuttons, with at least some of the functions changing with changing level. The application then interprets an actuation of a pushbutton according to the level existing at the time of the actuation.

Thus, it is a resulting feature of the invention that an array of conventional pushbuttons can be interfaced to the general purpose microcomputer via a keyboard port, the display driven by the application software to provide touch screen like functionality to the pushbuttons, with the multiple levels of the application assigning multiple functions to the pushbuttons depending on the level. It is a significant feature that this is all accomplished without the need for any special purpose interface boards in the computer and without the need for specially design screens capable of sensing touch.

These and other features of the invention are achieved by providing a special purpose microcomputer-based terminal for interactive user interface. The terminal utilizes a general purpose microcomputer having a display port and a keyboard port. The keyboard port is interfaced to a microcomputer keyboard driver of the type responsive to interpret keystroke signals in a standard format transmitted from a standard alphanumeric keyboard. However, the microcomputer-based terminal does not have a standard alphanumeric keyboard connected to the keyboard port. Instead, a user input module includes a plurality of electrical pushbuttons arranged along at least one side of the display and an encoder circuit for detecting the actuation of each pushbutton and producing a keystroke signal identifying the actuated pushbutton and compatible with the standard format of the keyboard driver. The user input module is connected to the microcomputer via the keyboard port. A standard general purpose display screen is connected to the display port of the microcomputer. A program memory in the microcomputer contains instructions which (a) assign specific input functions to the pushbuttons, and (b) display pushbutton function assignments on the display screen in positions coordinated to the positions of the pushbuttons. The program memory also contains instructions which respond to signals received from the keyboard driver initiated by actuation of a pushbutton by determining the function specified by the pushbutton actuation and executing the determined function.

In a more particular embodiment, a program memory in the microcomputer contain an input/output module having multiple levels for assigning level-specific functions to the pushbuttons. The input/output module includes a display module for displaying on-the-screen representations of the pushbuttons and the functions assigned to the pushbuttons at each level. The input/output module also includes an interpreter for interpreting a keystroke signal in accordance with the function assigned to the actuated pushbutton at the associated level. The program memory, in addition to the input/output module, also contains an application module for executing the interpreted function assigned to the pushbutton at the interpreted level.

In a particular application, the special purpose terminal is a waiter's terminal for a restaurant in which the multiple levels of the input/output module include a stored series of nested menus including root level menus branching to elemental level menus. The root level menu is adapted to assign the courses of a meal to the function keys, a mid-level menu is adapted to assign selections to the courses specified in the root level menu, and sub-level menus are adapted to refine the selections in the mid-level menus. The application module is adapted to guide the user through the menus in completing a selection of a meal, and to produce, at a printout station, an itemized check.

Other objects and advantages will become apparent from the following detailed description when taken in conjunction with the drawings, in which:

DETAILED DESCRIPTION OF THE PREFERRED EMBODIMENTS

While the invention will be described in connection with certain preferred embodiments, there is no intention to limit it to those embodiments. On the contrary, the intent is to cover all alternatives, modifications, and equivalents included within the spirit and scope of the invention as defined by the appended claims.

Figure 1:
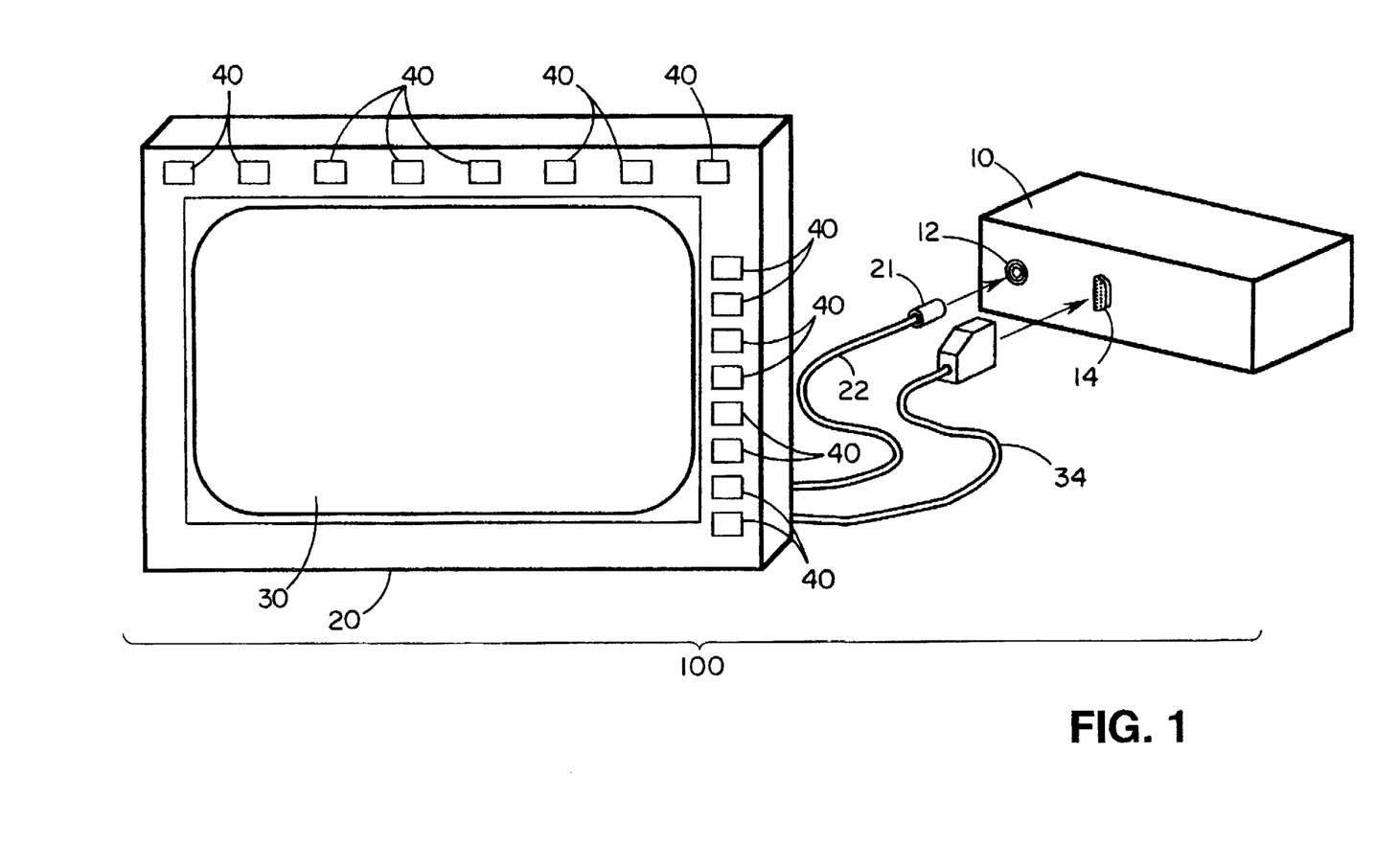
FIG. 1 illustrates a presently preferred embodiment of the interface terminal of the present invention.

Turning now to the drawings, FIG. 1 shows an embodiment of the interactive interface terminal 100 of the present invention, which comprises an interface module 20 and a microcomputer 10. The microcomputer 10 is a general purpose computer comprising a microprocessor-based CPU. The phrase "general purpose" as used herein means that the microcomputer is of the type generally available for interfacing with a variety of devices and capable of operating a wide range of software applications. It is to be contrasted with "special purpose", which connotes a microcomputer system specially adapted for a limited specific purpose. An example of the former is the wide range of DOS-based computers available from a large number of manufacturers, while an example of the latter might be a terminal dedicated to dispensing lottery tickets.

The general purpose microcomputer 10 conventionally has a keyboard port 12 and a display port 14. A standard alphanumerical keyboard is typically connected to the microcomputer through the keyboard port, often to serve as the primary input device. The general purpose computer used in the terminal of the present invention, however, does not have a standard keyboard connected to the keyboard port 12. The display port 14 allows a standard display screen 30 to be connected to and driven by the microcomputer. The display 30 is illustrated as a CRT, although other forms such as the LCD display can be used.

Figure 3:
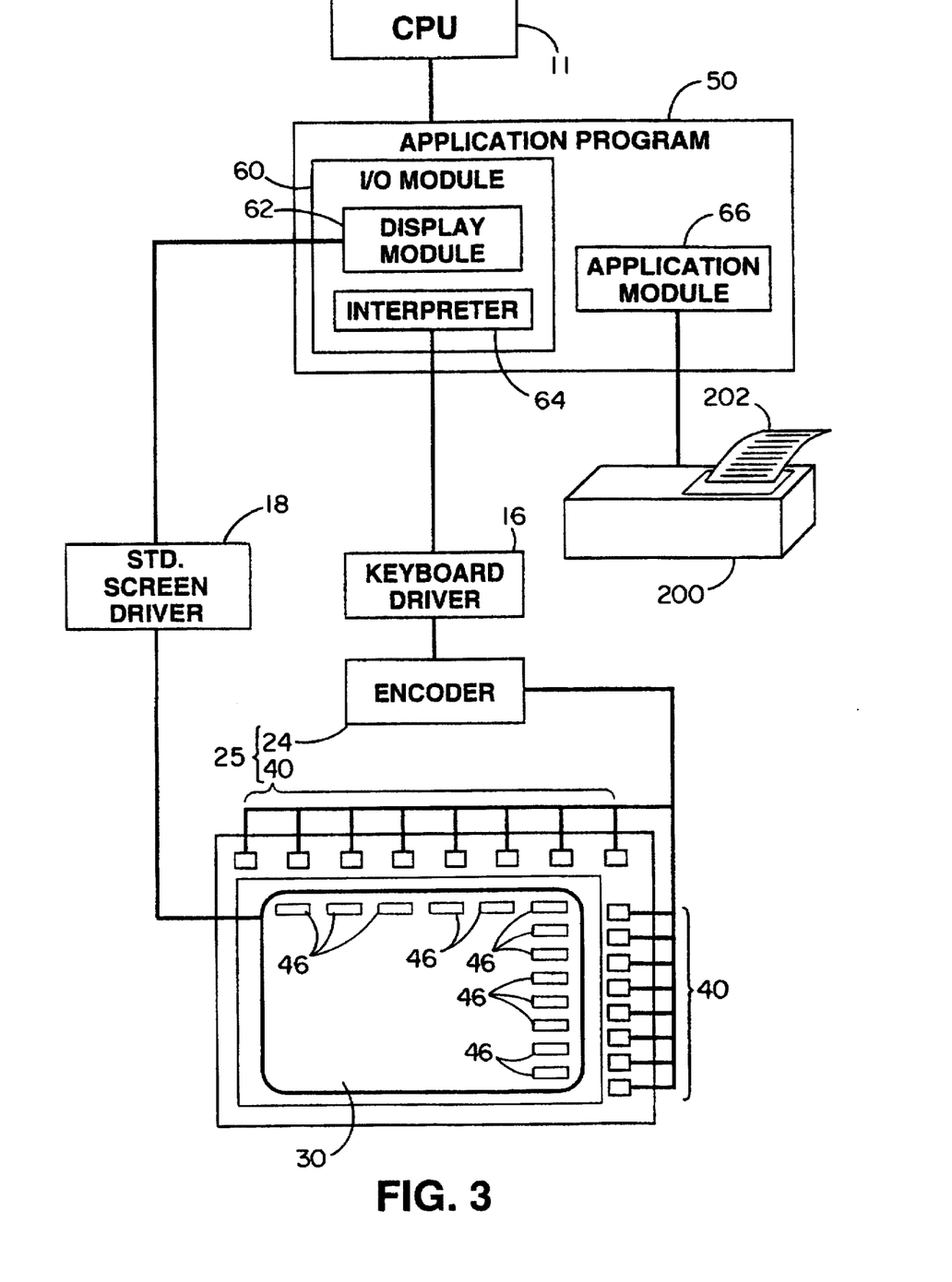
FIG. 3 shows a schematic illustration of the functional organization of the terminal of the present invention.

Internally to the microcomputer 10, the keyboard port 12 is interfaced to a keyboard driver 16 (FIG. 3). The keyboard driver is compatible with a standard alphanumerical keyboard, and includes hardware and software elements. The hardware elements include the necessary integrated circuits and the like which accept signals from the keyboard and process them to produce data words recognizable by the microcomputer system. The software elements include keyboard driver elements, typically resident within the input/output system (e.g., the BIOS), which process the keyboard signal to produce data words which serve as inputs to the microprocessor within the computer system. Both the hardware and software elements are resident in the typical general purpose microcomputer 10 such that it is only necessary to plug a keyboard into the port 12, the hardware and software elements of the keyboard driver being available to immediately accept input from the keyboard.

Generally, a keyboard functions by converting a keystroke into an electrical signal, generally a binary code. To that end, the conventional keyboard itself usually includes a keyboard encoder which performs the ordinary tasks of scanning the keyboard, detecting actuations of any keys, and producing binary coded signals indicating the identity of the key which had been depressed. The code which is produced by the encoder is transmitted to the microcomputer through a signal bus terminated with a connector 21 connected to the keyboard port 12. The keyboard driver 16 (FIG. 3) within the microcomputer receives the code and produces data words accessible to the microcomputer system for determining which key has been actuated, and responding according to the program in operation at the time. Because a keyboard is a standard input device for general purpose microcomputers, most general purpose microcomputers contain a keyboard driver as a standard feature.

In accordance with an important aspect of the present invention, the special purpose interface module 20 makes full use of the keyboard port 12 and its associated drivers in integrating the special purpose user interface of the present invention with a general purpose microcomputer 10. In addition, the interface module 20 of the present invention makes use of a general purpose display screen 30, such as the illustrated CRT, driven from the standard display port 14 through a connection cable 34. It will thus be appreciated that the only truly special purpose features of the present invention are the input interface elements themselves, the remainder being elements which are integral to the readily available, and generally inexpensive available, standard microcomputer system.

Turning in greater detail to the input aspects of the invention, the input module 25 (FIG. 3) comprises a plurality of pushbuttons 40 mounted on a bezel 41 surrounding the screen 30. Preferably, the pushbuttons 40 are arranged in lines along two or more sides of the display screen 30. The interface module 20 in FIG. 1 has eight buttons above the screen 30 and eight buttons along the right side of the screen, forming an inverted "L" shaped array. The number of the pushbuttons and their locations alongside the screen can be varied according to the needs of a specific application. For instance, the pushbuttons can be located along only one side of the screen 30. It is preferred, however, to arrange the pushbuttons 40 in an inverted L-shape forming two lines, one along the top and the other along the right-hand side of the screen 30. In conjunction with the display which is utilized in the assignment of functions to the pushbuttons, the inverted L as illustrated in the figures is most readily suited for ease of operation by a right-handed person. In order to produce signals which are readily interpreted by the keyboard driver of the standard microcomputer, the input module includes an encoder circuit 24 (FIG. 3) which senses the actuation of the pushbuttons and generate keystroke signals which are identical in form to the keystroke signals generated by a standard keyboard. The keystroke signals are transmitted through a signal bus 22 terminated with a connector 21 connected to the keyboard port 12. Because the keystroke signals are compatible with the standard format of the keyboard driver, they can be handled by the keyboard driver, and processed by the BIOS to be made available to the application software being operated in the microcomputer. As a result, no specially designed drivers (either hardware or software) are needed for handling the input from the interface module.

There are significant advantages to using an interface module which can be driven by a general purpose microcomputer without any specially designed drivers. The cost of the terminal system is lower and installation of the system is simpler because no special drivers are required. The interface module is also more portable in the sense that it can be matched with different microcomputers without having to install special drivers. Because the method of interfacing a keyboard to a general purpose microcomputers is fairly standardized, developing an application program which receives input from the keyboard port generally requires less testing and debugging than developing a program receiving input from a specially designed driver circuit. Furthermore, new applications can be developed or existing applications can be modified without the need for a special purpose terminal. Indeed, software development can be performed on a standard microcomputer using a standard keyboard, so long as the software developer knows the particular codes of the keyboard signals which will be used for each of the buttons 40 in the special purpose terminal 100.

In practicing the invention, there is provided, in combination with the array of pushbuttons around the display, means for assigning particular functions to the pushbuttons, and changing the assignment of functions at different levels of the application program. Because the number of pushbuttons should be quite limited in order to keep the user interface reasonably simple and intuitive, it will usually be desirable to assign multiple functions to at least some of the pushbuttons. It is therefore necessary to indicate to a user which function has been assigned to a pushbutton.

Figure 2:
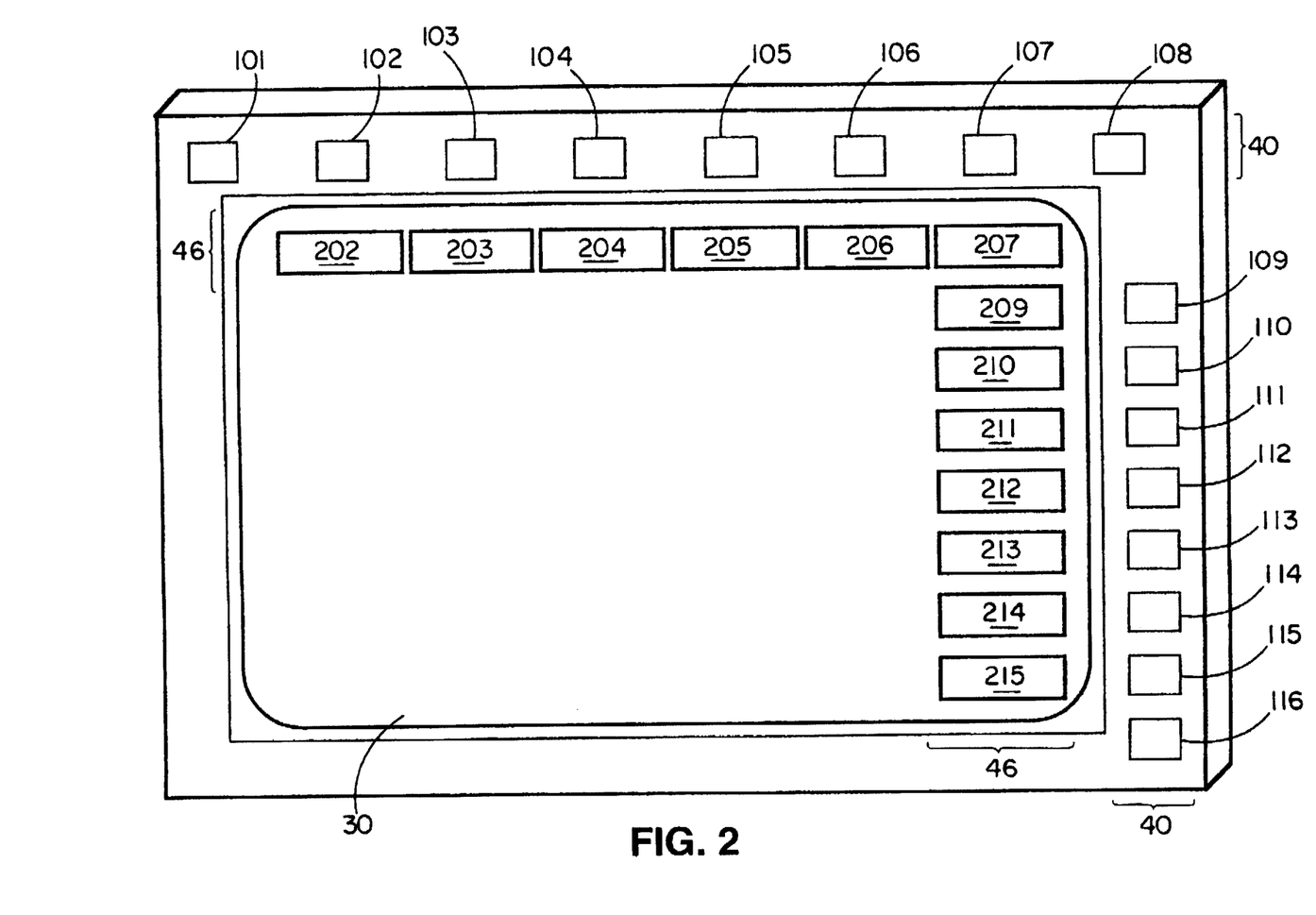
FIG. 2 shows an embodiment of the interface module according to the present invention and graphic representations of the pushbuttons displayed on the screen of the interface module.

FIG. 2 illustrates a preferred means for accomplishing that. The interface module 20 as shown in FIG. 2 has an array of pushbuttons 40 which are individually numbered 101–116. As shown in FIG. 2, the application software operated within the microprocessor causes the display on the screen 30 of a group of graphic representations 46 individually numbered 202–207, 209–215. A graphic representation is a graphic image suggestive of a pushbutton. The graphic representations 46 are positionally juxtaposed to the pushbuttons 40, and indicating the function which is currently assigned to each of the pushbuttons. To further assist the user in selecting a function, information about the functions may also be displayed on the screen. By coordinating representations 46 on the screen 30 to the positions of the pushbuttons 40 along the sides of the screen, the user can clearly tell which pushbutton 40 is assigned to which graphic representation.

FIG. 2 shows the preferred embodiment of the interface module of the present invention which has the pushbuttons 40 arranged in an inverted "L" shape. Because the representations 46 of the pushbuttons are positionally coordinated to the pushbuttons 40, the center of the screen 30 is free for display of application information.

When the user actuates a pushbutton 40, a keystroke signal is sent to the keyboard driver 16 (FIG. 3). The program uses the signal received through the keyboard driver to determine which pushbutton has been actuated, thereby determining which function has been selected. For example, when the pushbutton 202 is actuated, the function assigned to it by the program is selected.

Besides being used to select functions, the pushbuttons can be used for entering alphanumeric data. For example, the function assigned to pushbutton 202 in FIG. 2 may be to input the digit "1". Pressing that button then interpreted by the program as that the digit "1"has been entered.

It may be desirable in some situations to assign permanent functions to some of the pushbuttons, and those functions can either be assigned, insofar as the user interface is concerned, by indicators on the screen 30, or by permanent markings on the buttons 40. In the preferred embodiment of the interface module as shown in FIG. 2, the three pushbuttons 101, 108, 116 located at the upper left, upper right, and lower right corners of the bezel 41 surrounding the screen 40 are generally reserved for those fixed special functions.

FIG. 3 illustrates schematically the functional organization of the terminal of the present invention. The application program 50 in the memory can generally be viewed as functionally comprising two major modules. The first module is the I/O module 60 which is responsible for controlling the course of the computer-user interaction. The course of interaction may be viewed as comprising many levels, and at each level the user is required to make one choice. The operation of the program correspondingly has many levels. At each level the I/O module 60 performs the output function of presenting to the user a set of functions for the user to choose from, and the input function of receiving a keystroke signal from the user indicating which function has been selected. The functions presented to the user are level-specific, meaning that which functions are presented depends on the level of operation. The I/O module 60 also assigns the level specific functions to the pushbuttons 40 so that the user can press one button to select its assigned function.

The second module in the application program is the application module 66. This module is responsible for carrying out the functions selected by the user. For instance, a selected function can be printing out a check 202 on an attached printer 200, or displaying a road map on the display screen 30.

Based on the input or output functions, The I/O module 60 can be further viewed as comprising a display module 62 and an interpreter 64. The display module 62 performs the output function of displaying on the screen graphic representations 46 of pushbuttons and their respectively assigned level-specific functions. The interpreter 64 performs the input function. The interpreter 64 receives from the keyboard driver 16 a signal identifying the pushbutton 40 that has been pressed, and checks the level-specific function assignments of the pushbuttons 40 to determine which function has been selected by the user. It will be appreciated that each level of interaction involves the operation of the display module 62 and the interpreter 64.

Operating the terminal of the present invention requires simply looking at the screen 30 and pressing a button 40. Due to the visual connection between the buttons and the graphic representations 46, these actions are relatively simple and intuitive, and are very similar to the looking and pointing actions for a touch screen.

While providing ease of operation similar to that of touch screens, the interface module of the present invention has several advantages over a touch screen. First, unlike touch screens which requires special construction and electronic circuits for detecting a touch, electrical pushbuttons are simple devices which are inexpensive and easy to maintain. Second, the present invention utilizes the already existing drivers in the microcomputer, thereby eliminating the need of a specially designed drivers or interfaces.

In many applications, the instructions in the application memory of the microcomputer can be programmed to present to a user functions organized in a hierarchical menu tree fashion. At a given time the program displays on the screen selection indicators for options on one level of the menu tree. After the user selects an option by pressing a button, the program responds by presenting new functions on the next level of the menu tree to the user. Which new options are presented depends on which option has been selected. By consecutive actuations of the buttons, a user can select a path through the menu tree.

Inputting and processing orders from a customer in a restaurant, that is functioning as a special purpose waiter's terminal, represents a currently preferred application for a microcomputer-based terminal according to the present invention. The terminal of the present invention is well suited for such an application, because its interface module is less sensitive to contamination than a touch screen, and is not as susceptible to accidental damage as a standard keyboard. Its simplicity of operation also makes it superior to a interface terminal using a keyboard or a mouse.

When a terminal of the present invention is used as a waiter's terminal for entering orders from customers, the multiple levels of input/output module may include a stored series of nested menus containing options available from a regular restaurant menu. The menus are nested to provide a basic or root level menu branching to elemental level menus, the elemental menus including, at least in some cases, mid-level menus followed by sub-level menus. This nesting is convenient in order to automatically move from a selection at a root level to the options available at a mid-level, to refinements to the selected options available at sub-level menu. The user need not be concerned with how to get from level to level in order to make the selections. Simply making a selection at one of the higher level menus indexes the level to the next sequential appropriate level, based on the selection already made, so that the sub-items and refinements can be selected.

In greater detail, FIGS. 4A–4F illustrate a series of screens forming at least one branch of a series of nested menus in a waiter's terminal according to the present invention. These figures each show a display screen 30 illustrated at one level of the application software. They also illustrate the multi-function pushbuttons 40 arranged on the bezel 41 surrounding the screen 30, and demonstrate a sequence of steps for selecting a path through the hierarchal menu tree of options.

Figure 4A:
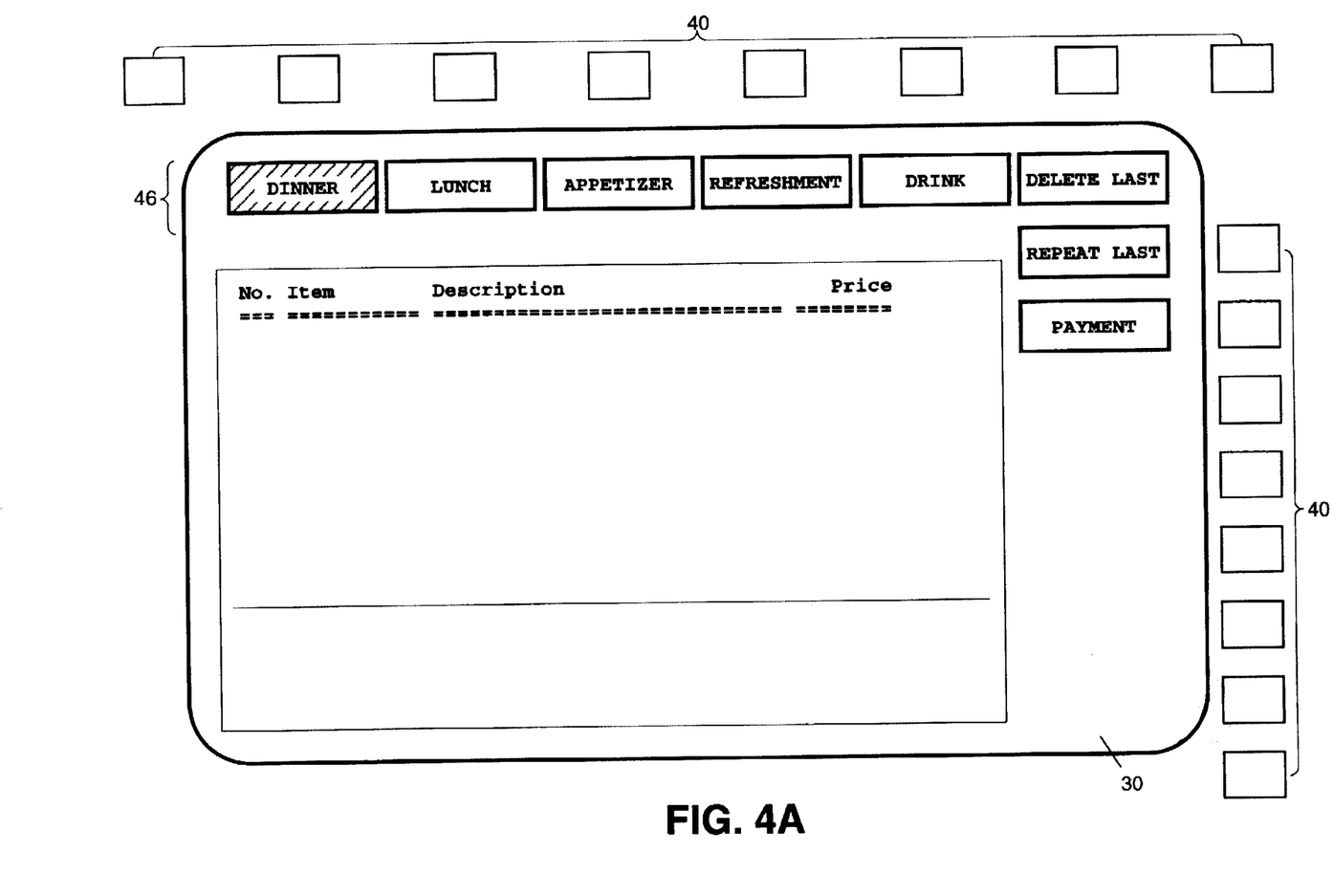
FIGS. 4A-4F illustrate a sequence of screen displays for a restaurant application which presents menu selections organized in a hierarchal menu tree fashion.
Figure 4B:
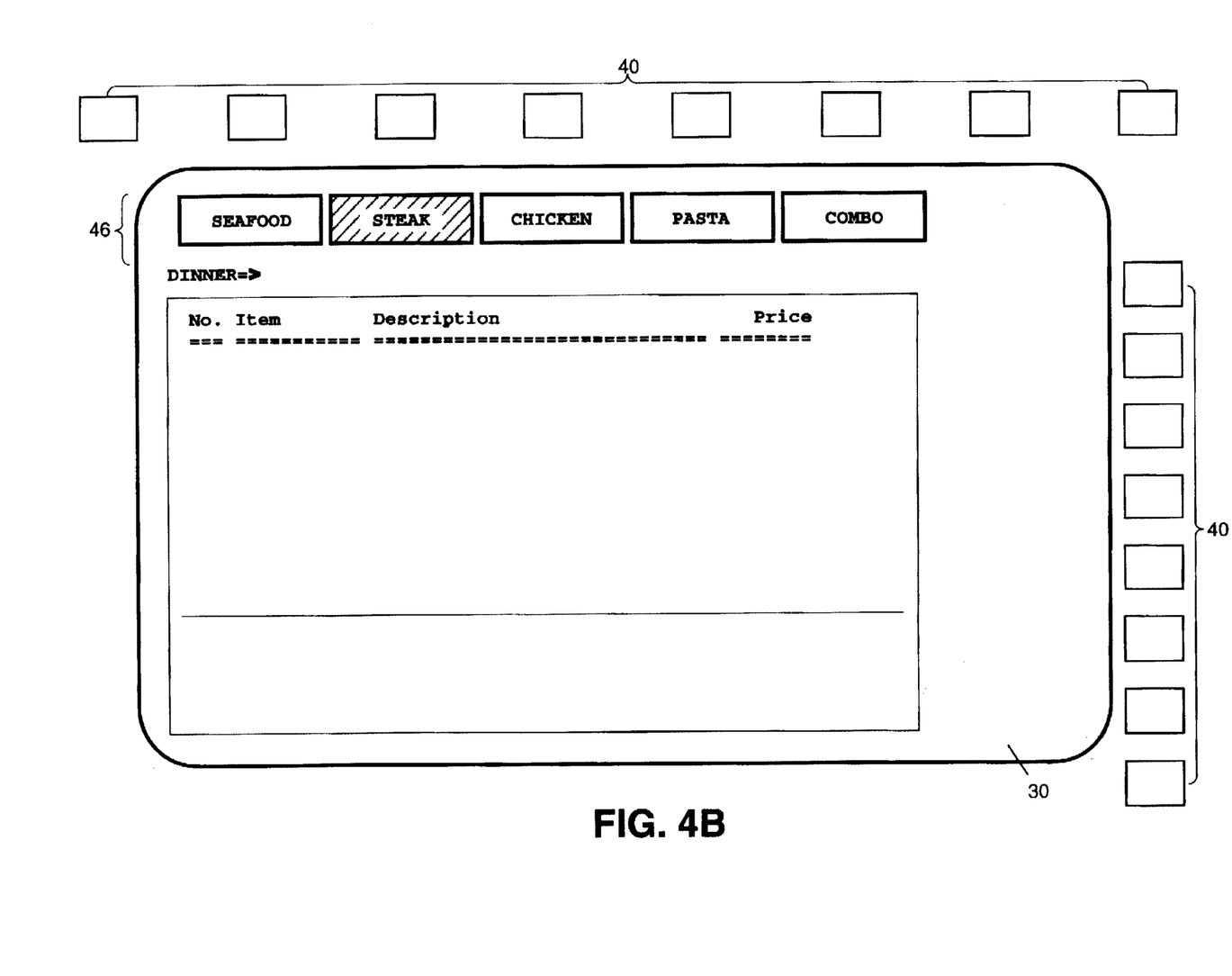
Figure 4C:
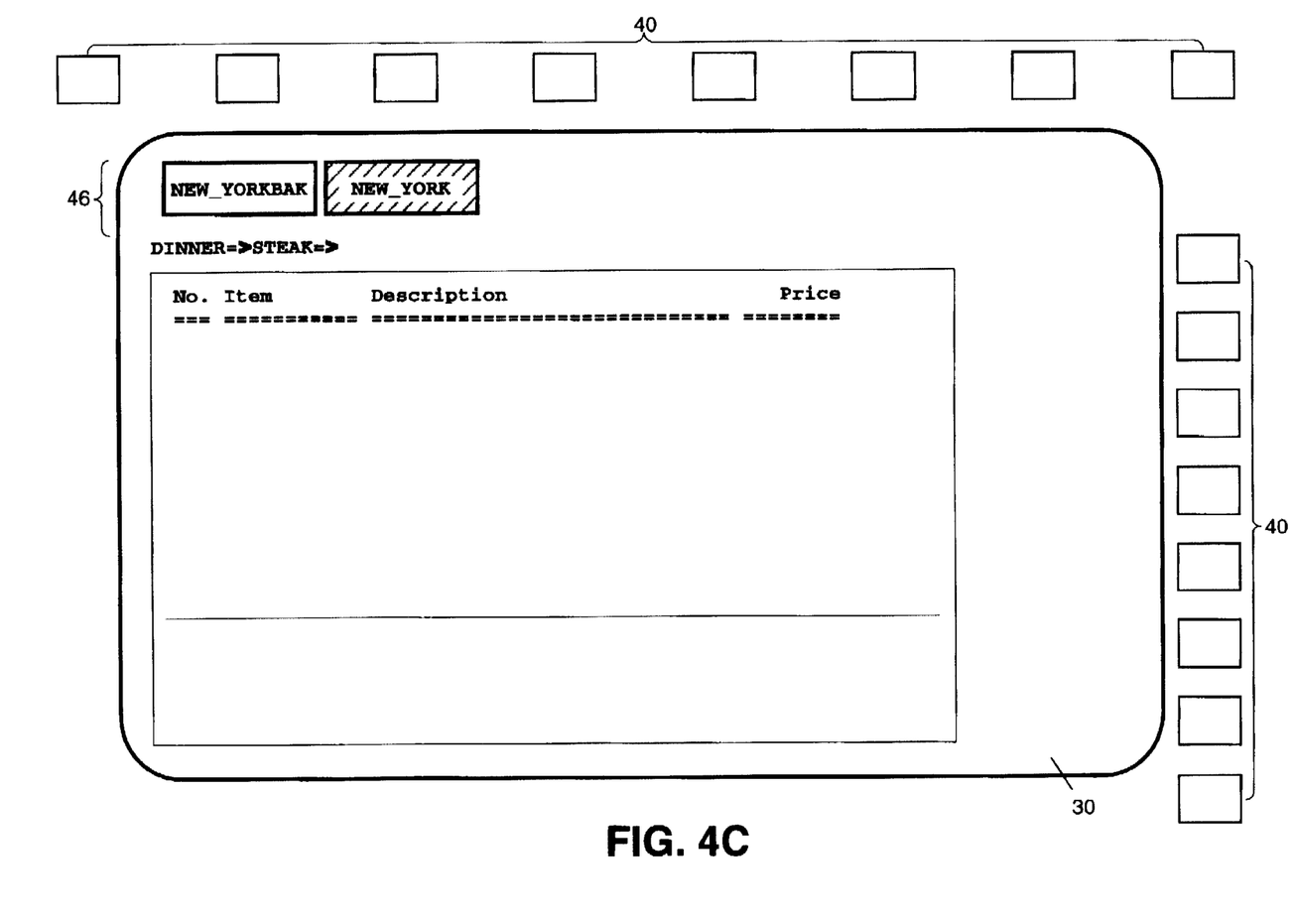
Figure 4D:
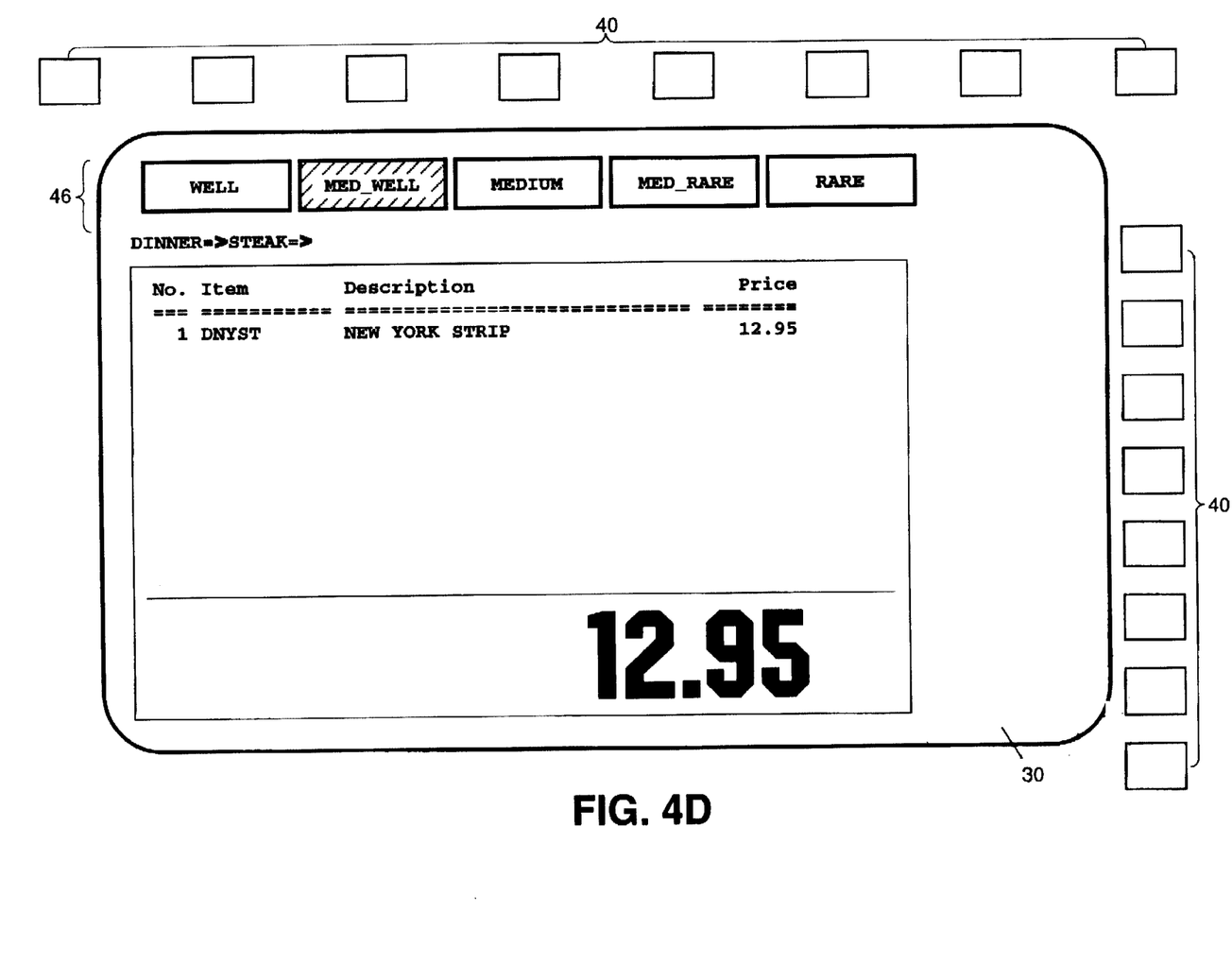
Figure 4E:
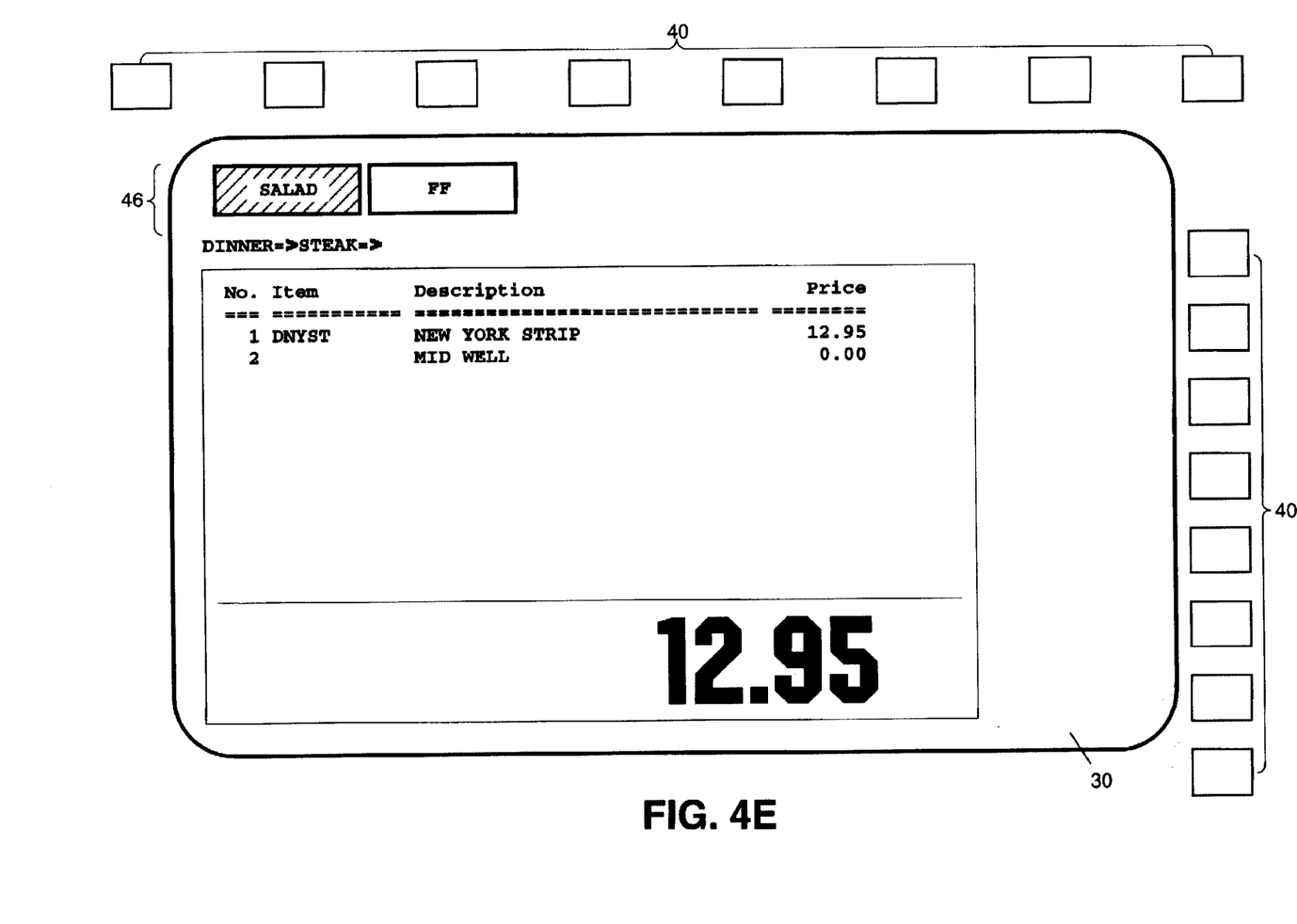

Beginning with FIG. 4A, the screen 30 shows graphic representations 46 in rectangular boxes for options on the root level of the menu tree, indicating that the user can order dinner, lunch, appetizer, refreshments or drink. The graphic representation labeled DINNER in FIG. 4A is shaded to indicate that it is selected by the user. The same convention is used in FIGS. 4B–4F. The representations labeled DELETE LAST and REPEAT LAST allow the user to change the last selected item, or to duplicate it. Moving now to FIG. 4B, after the user selects the dinner option, the screen shows different types of entree, and steak is selected. FIGS. 4C & 4D show screen displays allowing the user to select the type of steak and how it is cooked. FIG. 4E shows that the user can choose between salad and French fries (FF), and the user chooses salad. After choosing salad the order for dinner is complete, and the screen display in FIG. 4F shows again representations 46 for the options on the root level. The waiter can then enter other selections such as a drink order or another dinner or, alternatively, can actuate the enter pushbutton which enters the order for processing. Displays in the kitchen and other related aspects of the system are not directly related to the present invention and therefore will not be described.

Figure 4F:
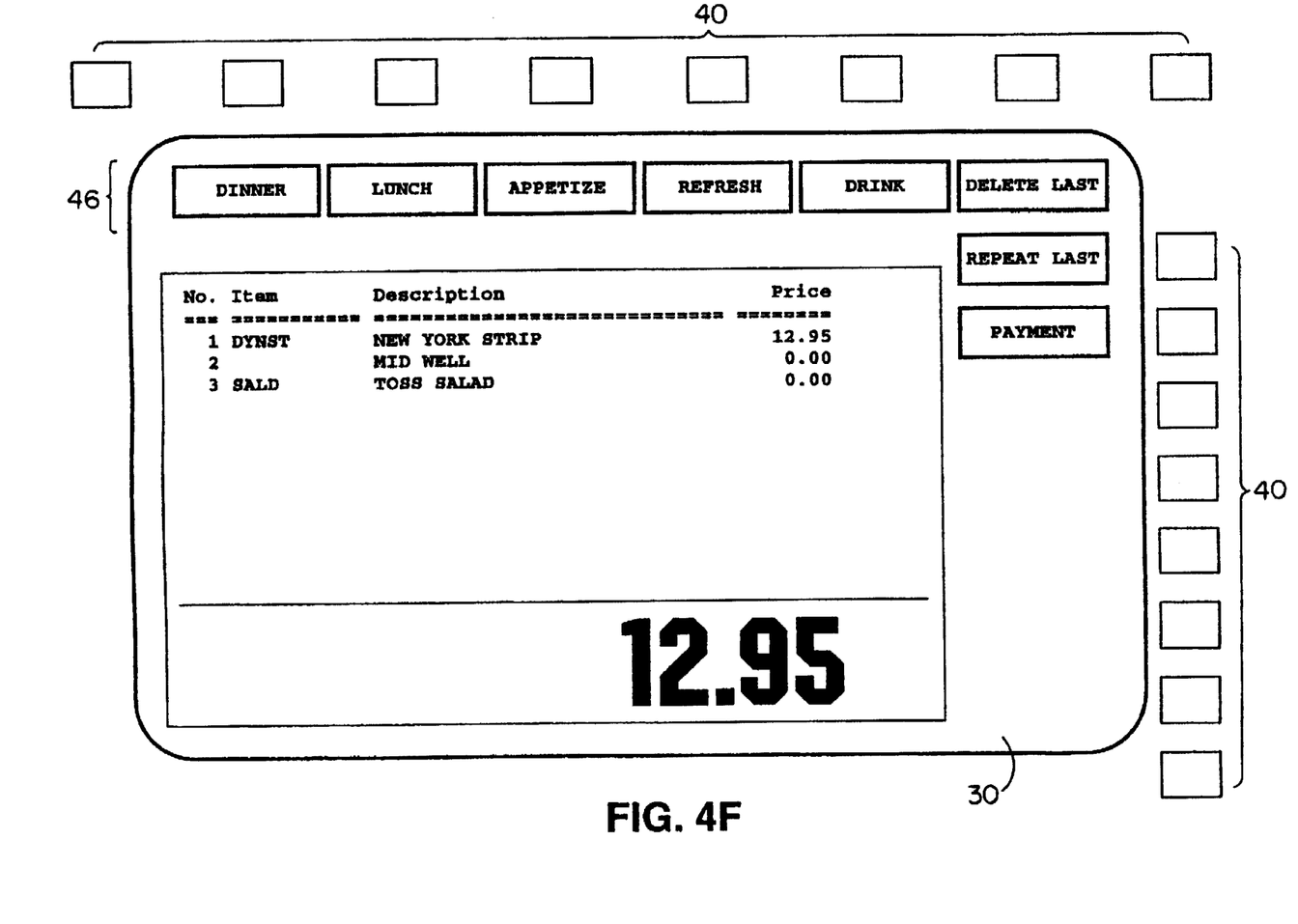

While the I/O module 60 (FIG. 3) of the program for the waiter's terminal handles menu selection, the application module of the program is preferably configured to help guide the user through the menus in completing a selection for a meal. For example, the application program can display on the screen the descriptions of items ordered, their individual and total costs, etc. After the selection for a meal is completed, as illustrated in FIG. 4F, the application module may produce, as illustrated in FIG. 3, a detailed check 202 on a printout station 200 showing the selections, their individual costs and the total cost, etc.

An application program for a waiter's terminal can, of course, have many more levels than the levels illustrated in FIG. 4A–4F. The menu tree formed by the levels shown in FIG. 4A–4B which is can be only a branch of a much larger menu tree structure, with levels above and below it. For instance, before entering the order entry sequence shown in FIG. 4A–4F the program may require the user to indicate whether he is taking a new order or adding a new item to an existing order.

Figure 5:
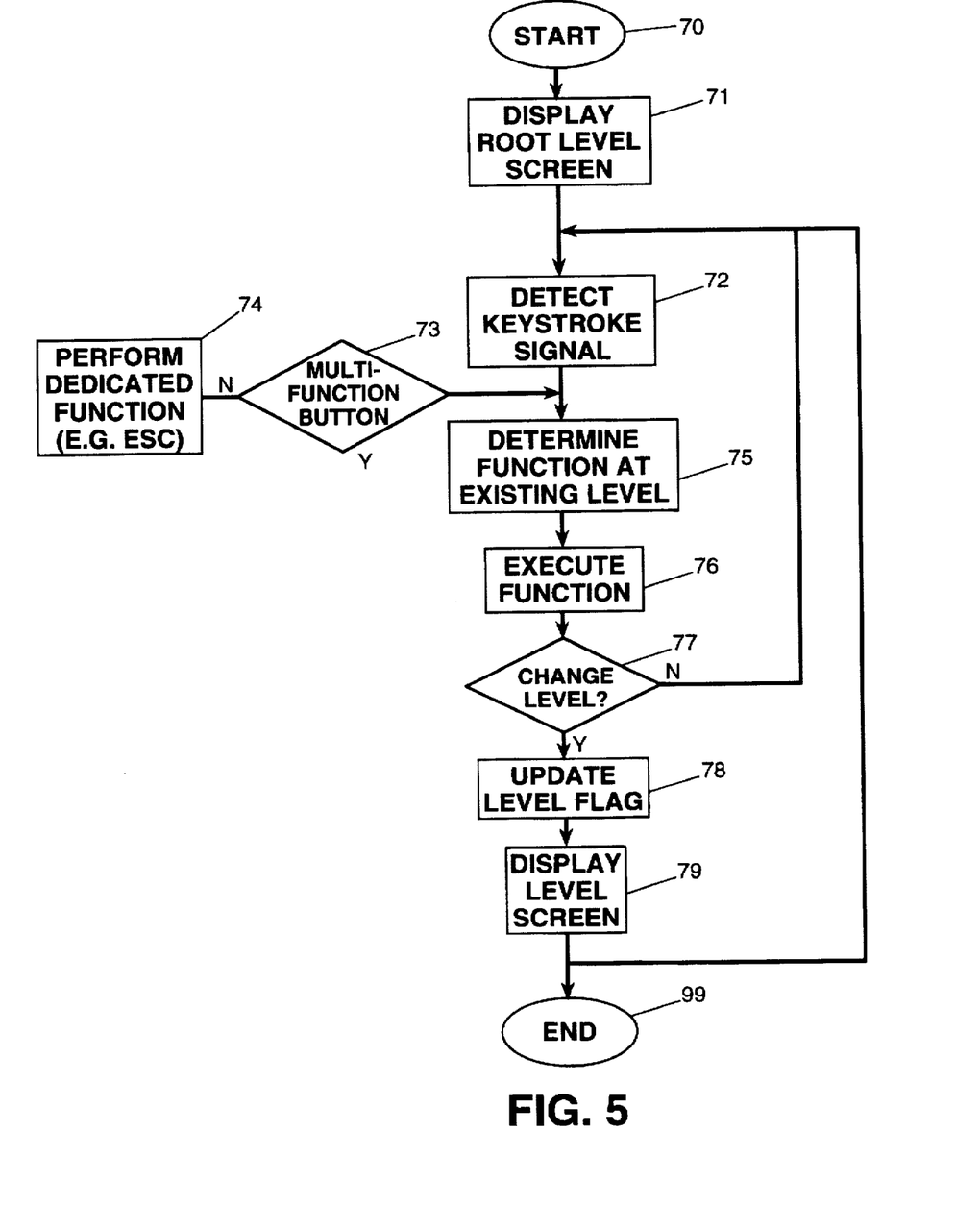
FIG. 5 shows a flow chart illustrating the sequence of operation of an application program having multiple levels of functions.

FIG. 5 presents a flow chart illustrating the sequence of operation when using an application program which configures the terminal system as a waiter's terminal. The program starts at 70 and progresses to a step 71 which displays a root level screen. The root level screen is like that illustrated in FIG. 4A which shows all of the selections which are available at the root level. When a keystroke is detected by the keystroke encoder, and an encoded keystroke signal is passed to the keyboard driver, after passing through the BIOS system, it is presented to the application software as a data word indicating the identity of the pushbutton which had been depressed. This operation is generally indicated in the block identified as 72 in FIG. 5. A test 73 is performed to determine if the pushbutton which had been depressed is one of the multi-function buttons. This is for the case where a number of the pushbuttons are assigned dedicated functions, such as the escape function. If the pushbutton actuation is not a multi-function button, the program branches to a step 74 to service the dedicated function key, such as escape. An escape will exit the application program and return to the basic screen at power up, which in some applications may, for example, be the first screen of the day where the restaurant operator enters the initial information, assigns waiters, and the like.

In normal operation, the step 73 will test positive, and the program will be routed to a step 75 which determines the function for the actuated pushbutton at the existing level of the application program. Assuming that the program is at the root level, and one of the buttons is actuated, the step 75 determines the function at that level, such as by reference to a look-up table. A step 76 is then performed by the standard microprocessor software operating according to the application which is operating in the microprocessor to execute the function. The function may or may not require a change in levels for the displayed function. A test is performed in the step 77 to determine if such a change is required. If it is not, the program branches back to the step 72 to detect the next keystroke. If a level change is required, a step 78 is performed to update the level flag. The step 78 is operated according to the particular requirements of the application software to progress through the menu tree according to the particular selection which has been made. A step 79 is then performed to display the screen for the new level, and the program branches back to the step 72 to detect the next keystroke for next selection. The input/output program continues to cycle in the loop illustrated in FIG. 5 until an enter button is depressed. The actuation of the enter button will typically be detected in the step 73 and will cause a branch to the step 74 which will enter the information which had been input thus far into the portion of the application which will cause the ordered meal or meals to be prepared in the kitchen, bills to be prepared, and the like. Insofar as in the input/output aspects of the program are concerned, however, step 99 indicates that they are at an end.

As a significant but subsidiary feature of the invention, it will sometimes be useful to enter free form alphanumeric information into a special purpose terminal such as that illustrated in FIGS. 1 and 2. Accordingly, for simple entry of free form alphanumeric information, means are provided for dedicating the pushbuttons in level-by-level fashion to portions of the standard alphanumeric character set to allow a user to select and input individual letters or numbers. This entry is accomplished much like making selections in a menu as described above.

When configuring a special purpose terminal to be adaptable to free form alphanumeric display, it is currently prefer to use 16 pushbuttons in the user interface. This allows three buttons to be dedicated to particular functions, such as escape, enter and backspace. That retains the remaining thirteen buttons for multi-function use. One of the thirteen buttons is preferably dedicated to a paging function which allows the user to control movement from one panel to another. The remaining twelve buttons are utilized for the alphanumeric character set, preferably arranged in three levels. The twenty-six letters of the alphabet and the ten numerals can thus be accommodated in only three panels of the display. The first panel will comprise letters A–L, the second panel will comprise letters M–X and the third panel will comprise letters Y–Z and the numerals 0–9.

Figure 6:
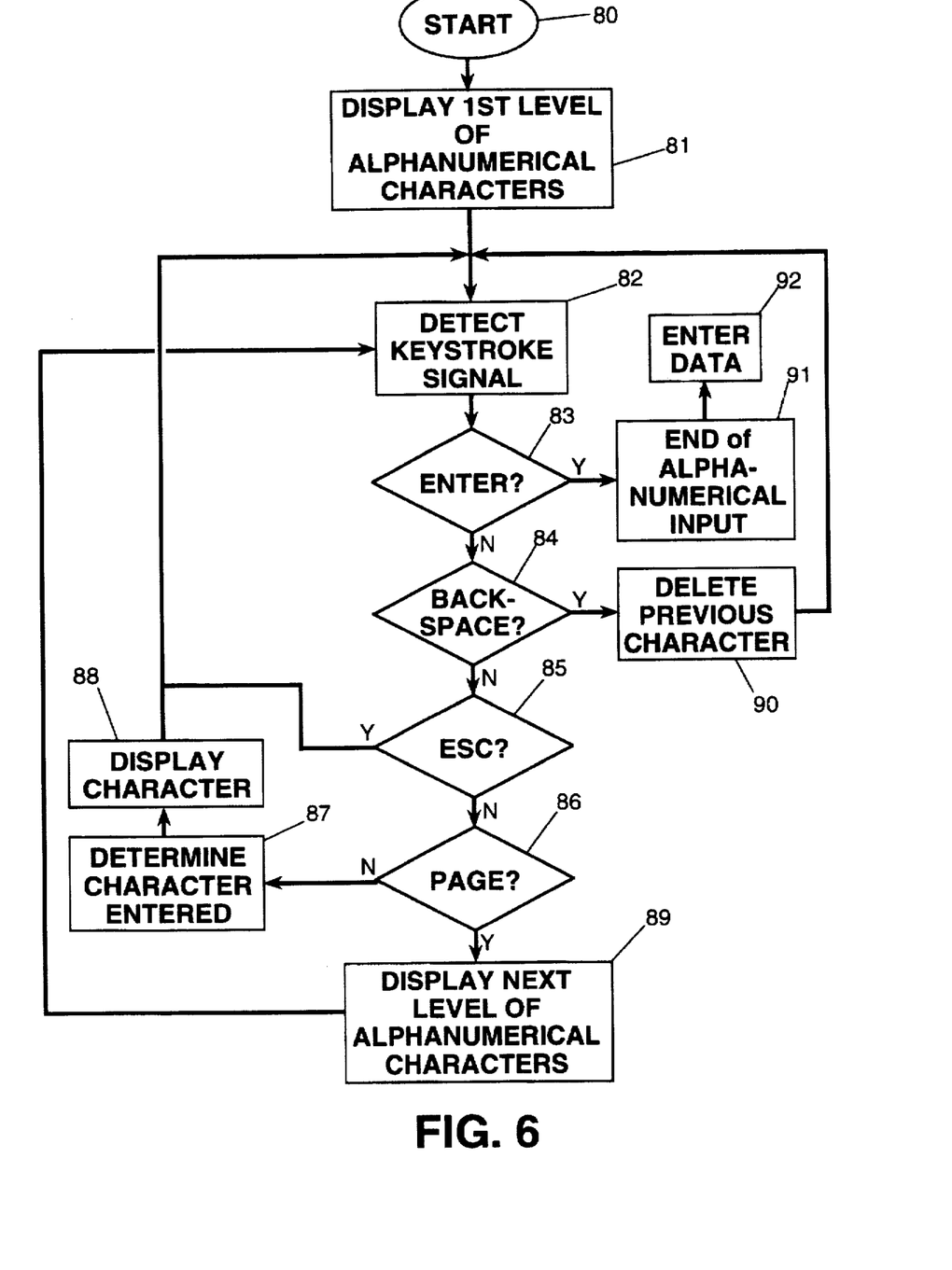
FIG. 6 shows a flow chart illustrating the process of entering alphanumeric information into a terminal of the present invention.

The entry of free form alphanumeric information utilizing a system such as that just described will be better understood with reference to the flow chart of FIG. 6. The process begins at a step 80. After selection of the alphanumeric mode, a step 81 is performed which displays the first level of the alphanumeric panel. Thus, the first twelve multi-function buttons will have displays projected on the display screen which show the letters A–L, the thirteenth button will show the page function, and the fourteenth through sixteenth buttons will have the dedicated functions of enter, backspace and escape.

When a pushbutton is actuated, the keyboard encoder will detect the actuation and produce a binary code which identifies the particular button which had been actuated. That signal is passed through the standard keyboard port through the standard keyboard drivers and the BIOS to the application which perform certain tests. First of all, the tests 83, 84 and 85 are performed to determine if any of the dedicated function pushbuttons have been actuated. If they have not, the program branches to a test 86 which determines if the multi-function page pushbutton has been depressed. Assuming that it has not, the program proceeds to a step 87 which interprets the keystroke signal to determine the character which has been entered. A step 88 is then performed to display the character which has been selected, preferably in the central portion of the screen. The program then returns to the step 82 to wait for the next keystroke without altering the display of the first level panel of the alphanumeric characters.

The operator is then free to select another character, or to change panels. Assuming he decides to change panels, the page pushbutton is actuated. The progress of the program proceeds as before, except that the test 86 will test positive following which a step 89 will be performed to display the next level of alphanumeric characters. The user then has a complete set of new functions for the pushbuttons comprising the second level of the alphabet, and can select one of the letters from that panel. He then either selects a particular letter and the program will proceed as first described, or will enter a page command again, following which the third panel will be displayed. The user proceeds as outlined here until a character string is presented on the display which is intended for input into the application program. If the user has made a mistake, the dedicated function backspace key is actuated, and the test 84 will branch to a step 90 which will delete the previous character, return to the panel being displayed and allow the user to enter a new character. When the entry is complete, the user will actuate the enter pushbutton and the test 83 will produce a positive result. A step 91 will then indicate that the alphanumeric input is at an end and will progress to a step 92 which will enter the data word into the application. The manner in which the application uses the data word is not important to an understanding of the present invention. What is the important is the ability to use to a limited extent the special purpose, highly customized and generally foolproof special purpose user interface of the present invention in a free form alphanumeric mode.

To facilitate the entry of alphanumeric information, the interface module of the present invention can be configured to allow a standard keyboard to be connected to the keyboard port 12 (FIG. 1) through the interface module. For example, the interface module can be provided with a switching circuit and a connector for connecting a standard alphanumeric keyboard. The switching circuit performs the function of connecting the bus 22 (FIG. 1) to either the encoder 16 (FIG. 3) or the standard keyboard. Once the keyboard is connected to the bus 22 (FIG. 1), it can be used to enter alphanumeric information into an application program. The interface module can also be made to share the bus full time with a standard keyboard. In that case the program in the microcomputer will respond to both a keystroke on the keyboard and the actuation of a pushbutton on the interface module.

It was noted at the outset that the program is preferably divided into an input/output module and an application module. It will be appreciated by those skilled in the art, that this division is used primarily as an aid in understanding the invention, and that the software which implements the input/output modules and the application modules can be and often will be prepared as a single module. What is important is not the fact that separate modules are available, but that the different functions are being performed, and the use of separate modules in describing the invention herein is primarily a tool to aid understanding the different functions, rather than a requirement in how the application program should be segregated.

The mounting of pushbuttons on the bezel of the enclosure which houses the display is preferred, for providing the most ruggedized and professional looking finished product. However, the invention will have application to less permanent arrangements, such as retrofits. In those embodiments, the pushbuttons are arranged in a separate module which is positioned on the exterior of a conventional display. The module can provide a single line of pushbuttons, or can be L-shaped or U-shaped for multiple lines. It will be clear that achieving the positional relationship between buttons and indicators of the invention, does not require the permanency of mounting of the illustrated embodiment.

It will now be appreciated that what has been provided is a special purpose terminal which provides a simple and intuitive way of interactive user interface with simplified hardware requirements. The terminal uses an interface module which has pushbuttons along the sides of a display screen. The signal generated by actuating the buttons can be handled by the keyboard driver in the microcomputer, therefore no special driver is needed. The buttons can be used to select functions presented on the display screen as selection indicators, and by pressing the buttons a user can select a path through a hierarchal menu tree of functions.

What is claimed:

1. A special purpose microcomputer-based terminal for interactive user interface and comprising the combination of:
   a general purpose microcomputer having a display port and a keyboard port, the keyboard port being interfaced to a microcomputer keyboard driver of the type responsive to interpret keystroke signals in a standard format transmitted from a standard alphanumerical keyboard;
   an interactive interface module comprising a general purpose display screen connected to and driven from the display port of the microcomputer, and a user input module including a plurality of electrical pushbuttons arranged along at least one side of the display;
   the user input module including an encoder circuit for detecting the actuation of each pushbutton and producing a keystroke signal identifying the actuated pushbutton and compatible with the standard format of the keyboard driver;
   the user input module being coupled to the keyboard port so that the keystroke signals produced by the encoder circuit are transmitted to and processed by the keyboard driver;
   a program memory in the microcomputer for assigning level specific functions to individual ones of the pushbuttons and containing instructions which:
   (a) assign level-specific input functions to the pushbuttons, and display pushbutton function assignments for a specified level on the display screen in positions coordinated to the positions of the pushbuttons; and
   (b) respond to signals received from the keyboard driver circuit initiated by actuation of a pushbutton by determining the function specified by the pushbutton actuation for the specified level and executing the determined function.

2. The terminal as set forth in claim 1 wherein the program memory establishes multiple levels arranged in hierarchal menu tree fashion for receiving inputs from the pushbuttons;
   the instructions in the program memory are arranged to assign multiple functions to the pushbuttons corresponding to the multiple levels; and
   the instructions in the program memory are arranged to respond to actuation of a pushbutton by executing the function assigned thereto for the level in effect at the time of actuation of the pushbutton.

3. The terminal as set forth in claim 2, wherein the hierarchal menu tree of options contains options available from a restaurant menu, and the multiple levels correspond to respective meal courses and options.

4. The terminal as set forth in claim 3, including a second menu tree of options containing a plurality of levels together making up an alphanumeric character set, the multiple levels presenting sub-sets of the alphanumeric character set, and page means for changing from level to level and sub-set to sub-set.

5. A special purpose microcomputer-based terminal for interactive user interface and comprising the combination of:
   a general purpose microcomputer having a display port and a keyboard port, the keyboard port being interfaced to a keyboard driver in the microcomputer of the type responsive to interpret keystroke signals in a standard format transmitted from a standard alphanumerical keyboard;
   an interactive interface module comprising a general purpose display screen connected to and driven from the display port of the microcomputer, and a user input module including a plurality of electrical pushbuttons arranged along at least one side of the display;
   the user input module including an encoder circuit for detecting the actuation of each pushbutton and producing a keystroke signal identifying the actuated pushbutton and compatible with the standard format of the keyboard driver;
   the user input module being coupled to the keyboard port so that the keystroke signals produced by the encoder circuit are transmitted to the keyboard driver;
   a program memory in the microcomputer containing:
   (a) an input/output module having multiple levels for assigning level-specific functions to the pushbuttons and including:

(i) a display module for displaying on the screen representations of the pushbuttons and the functions assigned to the pushbuttons at each level;

(ii) an interpreter for interpreting a keystroke signal resulting from a pushbutton actuation in accordance with the function assigned to the actuated pushbutton at the associated level; and (b) an application module for executing the interpreted function assigned to the pushbutton at the interpreted level.

6. The terminal as set forth in claim 5 wherein the execution by the application module of at least some of the functions causes the input/output module to switch levels.

7. The terminal as set forth in claim 5 further including means in the input/output module for paging from level to level and coordinating the display of pushbutton functions and interpretation of keystrokes in accordance with the current level.

8. The terminal as set forth in claim 7 wherein the means for paging includes:

(a) one of the pushbuttons; and (b) the input/output modules assigns a page up/page down function to said one of the pushbuttons.

9. The terminal as set forth in claim 5 in which the user input module includes an inverted "L" shaped array of pushbuttons arranged in lines along the top and one side of the display, the display module displaying the on-screen representation in locations along the top and one side of the screen positionally corresponding to the positions of the pushbuttons, so that the center of the screen is free for display of application information.

10. The terminal as set forth in claim 5 wherein the multiple levels of the input/output module include a first said level assigning a first portion of an alphanumeric character set to the pushbuttons, second and third said levels assigning second and third portions of the alphanumeric character set to the pushbutton so that the plurality of levels make up a complete alphanumeric character set, and means are provided for paging between the levels to allow formation and entry of free form alphanumeric commands.

11. The terminal as set forth in claim 5 wherein at least one of the pushbuttons has a permanent function which is not altered by the input/output module.

12. The terminal as set forth in claim 11 wherein the plurality of electrical pushbuttons include an enter pushbutton and an escape pushbutton having permanent functions assigned thereto and which are not altered by the input/output module, so as to provide the ability to enter data or escape an application at any time during operation of the terminal.

13. The terminal as set forth in claim 5 in which the special purpose terminal is a waiter's terminal for a restaurant and in which:

the multiple levels of the input/output module include a stored series of nested menus including root level menus branching to elemental level menus, a root level menu being adapted to assign the courses of a meal to the function keys, a mid-level menu being adapted to assign selections to the courses specified in the root level menu, and sub-level menus being adapted to refine the selections in the mid-level menus;

the application module being adapted to guide the user through the menus in completing a selection of a meal, and to produce, at a printout station, an itemized check.

14. The terminal as set forth in claim 13, including a second menu tree of options containing a plurality of levels together making up an alphanumeric character set, the multiple levels presenting sub-sets of the alphanumeric character set, and page means for changing from level to level and sub-set to sub-set.

15. A method of simplifying the input/output operation in a special purpose terminal, the method comprising the steps of:

providing a general purpose microcomputer having a display connected to the display port and having a keyboard port of the type responsive to interpret keystroke signals in a standard format when transmitted from a standard alphanumeric keyboard;

providing an array of input pushbuttons, comprising the only input means for the terminal, and connecting said input pushbuttons through a keyboard encoder to the keyboard port, the number of pushbuttons being substantially less than the number of characters in a standard alphanumeric character set;

operating the terminal at a plurality of program levels each assigning different functions to at least some of the pushbuttons;

operating the keyboard encoder to assign particular keystroke signals to each pushbutton irrespective of the program level at which the terminal is operating;

assigning variable functions to the pushbuttons dependent on the program level at which the terminal is operating, as part of the assigning step displaying on the display a set of indicators for the functions assigned to the pushbuttons in positional relationship with the physical locations of the pushbuttons; and interpreting a keystroke signal received from an actuated pushbutton in accordance with the program level then in effect to cause the function displayed for the pushbutton to be performed upon actuation thereof.

16. The method as set forth in claim 15 including the further step of switching program levels to assign different functions to the pushbuttons, and interpreting the pushbutton actuations according to the different levels.

17. The method as set forth in claim 16 wherein the special purpose terminal is a waiter's terminal for a restaurant, and in which the step of assigning variable functions to the pushbuttons dependent on the program level includes sequentially displaying a stored series of nested menus including root level menus branching to elemental level menus, a root level menu assigning the courses of a meal to the function keys, a mid-level menu assigning selections to the courses specified in the root level menu, and sub-level menus refining the selections in the mid-level menus;

and the step of switching levels is nested to guide the user through the menus in completing a selection of a meal.

18. The method as set forth in claim 17 in which the step of assigning variable functions includes assigning a second set of functions to the pushbuttons comprising characters of an alphanumeric character set, segregating the characters of the alphanumeric character set into at least three groups, and the step of interpreting a keystroke signal includes identifying the pushbutton and the level to enter an alphanumeric character on the display corresponding to the function of the pushbutton at the current level.

* * * * *